No. 703,612. Patented July 1, 1902.
J. F. ROBINSON.
NUT LOCK.
(Application filed Dec. 31, 1901.)
(No Model.)
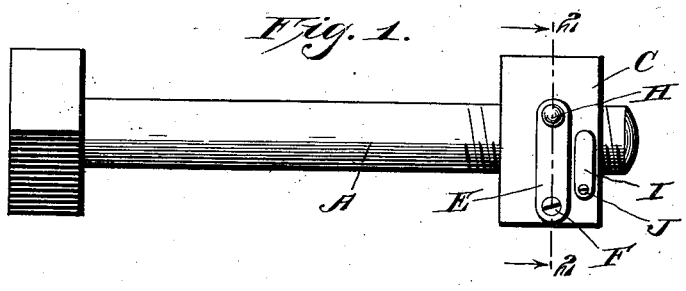
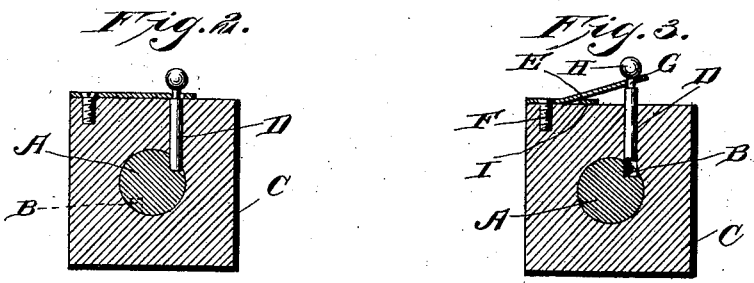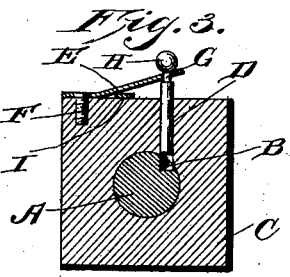
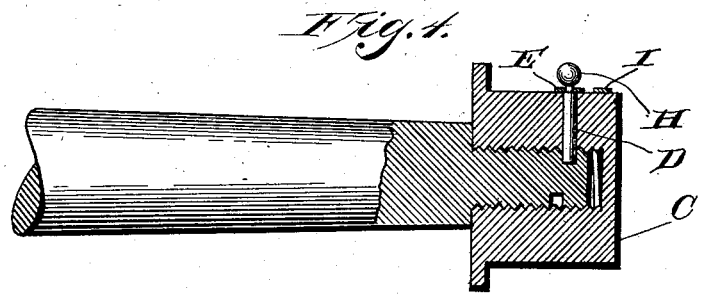
WITNESSES:
Louis D. Heinrichs
Tom L. McCullough
INVENTOR
James F. Robinson
BY
W. Preston Williamson
ATTORNEY.

UNITED STATES PATENT OFFICE.

JAMES F. ROBINSON, OF WACO, TEXAS.

NUT-LOCK.

SPECIFICATION forming part of Letters Patent No. 703,612, dated July 1, 1902.

Application filed December 31, 1901. Serial No. 87,964. (No model.)

*To all whom it may concern:*

Be it known that I, JAMES F. ROBINSON, a citizen of the United States, residing at Waco, county of McLennan, and State of Texas, have invented a certain new and useful Improvement in Nut-Locks, of which the following is a specification.

My invention relates to a new and useful improvement in nut-locks, and has for its object to provide mechanism attached to the nut which will prevent such nut from becoming loosened by vibration or otherwise, but will allow said nut to be turned in either direction when desired.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 is a plan view of a bolt and nut with my invention applied thereto; Fig. 2, a section on the line 2 2 of Fig. 1; Fig. 3, a similar section showing the locking-pin raised; Fig. 4, a longitudinal section of the end of the bolt and nut.

In the drawings, A represents a bolt of ordinary construction, the threaded end of the bolt having grooves B formed longitudinally of the threaded portion.

C is a nut adapted to be threaded upon the threaded portion of the bolt, and this nut has a hole drilled through from one face to its interiorly-threaded hole. In this opening is adapted to be guided a locking-pin D. This pin is arranged in such a position upon the nut that when it is pressed inward it will engage one of the grooves B, formed in the bolt, and thus prevent the nut from turning upon the bolt. For the purpose of always keeping the locking-pin D in engagement with the grooves B, I provide the flat spring E, which is secured to the nut by means of screws or otherwise at the point F, and the other end of the spring has formed in it a hole, through which protrudes the stem G of the locking-pin. This stem G is smaller than the body of the pin, and thus a shoulder is formed against which the spring operates to force the spring inward, its normal position being as shown in Fig. 2. A bolt-knob or other enlargement H is secured upon the outer end of the stem to prevent the spring from being detached at that end and also serves the purpose of a handle for withdrawing the pin.

Of course it would be exceedingly inconvenient to hold the pin outward while turning the nut, so I provide the turn-button I, which consists of a flat metallic strip pivoted at one end to the nut at the point J, and when the spring E is raised, as shown in Fig. 3, this turn-button I is placed beneath the spring E, which will hold the locking-pin D in the position withdrawn from the grooves B, and when it is desired to lock the nut the turn-button I is turned from beneath the spring, allowing the pin to engage the grooves.

The advantage of my invention is that by use of a very simple and inexpensive appliance I am enabled to lock the nut positively, but can instantly unlock the same to tighten it at any time.

While I have shown only two grooves formed in the bolt, it is obvious that any number could be employed, so that the nut would not have to be turned half-way around to engage another groove.

Another advantage of my invention is that it does not weaken the nut, as the only opening made through the nut is a small hole in which the locking-pin slides.

Of course I do not wish to be limited to the exact construction here shown, as slight modifications could be made without departing from the spirit of my invention.

Having thus fully described my invention, what I claim as new and useful is—

In a nut-locking device, longitudinal grooves formed in the threaded portion of the bolt, an opening formed through from the outside of the nut to the interiorly-threaded opening, a locking-pin adapted to reciprocate within said opening and engage the grooves formed in the bolt when the nut is in certain positions, a flat spring, one end of which is secured to the nut and the other secured to the locking-pin so as to be raised and lowered with the same and hooked against the pin so as to hold it in its locked position, a turn-button pivoted to the nut and adapted to be turned underneath the spring so as to hold the locking-pin out of engagement with the grooves, an enlargement formed upon the upper end of the pin for the purpose of withdrawing the same, substantially as and for the purpose set forth.

In testimony whereof I have hereunto affixed my signature in the presence of two subscribing witnesses.

JAMES F. ROBINSON.

Witnesses:
J. M. KILBOUGH,
TOM L. MCCULLAUGH.